United States Patent
Salgado et al.

(12)

(10) Patent No.: US 6,240,215 B1
(45) Date of Patent: May 29, 2001

(54) METHOD AND APPARATUS FOR DIGITAL IMAGE PROCESSING WITH SELECTABLE BACKGROUND SUPPRESSION DATA ACQUISITION MODES

(75) Inventors: David L. Salgado; James G. Nargi, both of Victor; Kevin F. Aubertine, Ontario; Francis K. Tse; Nancy R. Kelly, both of Rochester, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/159,016

(22) Filed: Sep. 23, 1998

(51) Int. Cl.[7] ........................................... G06K 9/40
(52) U.S. Cl. ................. 382/254; 382/274; 358/464; 358/1.13
(58) Field of Search ................... 382/254, 274, 382/275; 358/448, 461, 464, 1.9, 1.13

(56) References Cited

U.S. PATENT DOCUMENTS 3,652,791   3/1972  Shuey .
5,157,740  10/1992  Klein et al. .

FOREIGN PATENT DOCUMENTS 1-273064 * 10/1989 (JP) .......................................... 399/8

\* cited by examiner

*Primary Examiner*—Tommy Lee
(74) *Attorney, Agent, or Firm*—Fay, Sharpe, Fagan, Minnich & McKee, LLP (57) ABSTRACT

An image processing apparatus and method include a plurality of different background suppression data acquisition modes selectable by a user in order to obtain background suppression data from a document being reproduced. The obtained background suppression data is used by an image processing unit to suppress the background region of the document being reproduced. The user is able to select one of the plurality of background suppression data acquisition modes depending upon the user's desire for high speed document reproduction versus the required quality of background suppression. In this manner, the user is able to determine whether document reproduction speed or background suppression quality is to be emphasized. The user's choice of a background suppression data acquisition mode is selectively overridden if the image processing apparatus determines that a more performance-intensive background suppression data acquisition mode may be implemented to improve background suppression quality without an associated loss of document reproduction speed.

11 Claims, 6 Drawing Sheets

METHOD AND APPARATUS FOR DIGITAL IMAGE PROCESSING WITH SELECTABLE BACKGROUND SUPPRESSION DATA ACQUISITION MODES

BACKGROUND OF THE INVENTION

This application relates to the digital image processing arts. More particularly, the application relates to a method and apparatus for acquiring data from a document to be reproduced by scanning, with suppression of data from the background region thereof in the scanning operation. In certain instances, removal of the background data is highly desirable for purposes of improving the clarity of the digital image and the printed output version of same. Specifically, the present invention provides new and improved methods and apparatus for obtaining the background data from the original input document in the scanning process, wherein the user is able to select one of a plurality of different background suppression data acquisition modes which provide varying levels of background suppression quality and document reproduction speed.

The digital reproduction of a printed document, whether it contains text, continuous tone data, halftone images, and/or any other printed matter, requires the original document to be scanned and converted into digital data. Frequently, the original document will include a background region which is shaded, colored, flecked, or includes other miscellaneous marks thereon which are not intended to be a part of the image information contained in the document. In many instances, it is acceptable to simply reproduce this background data. However, in certain other instances, if this background region is not suppressed during the document reproduction process, the quality of the resulting digital image may be undesirably affected. For example, while a colored background may be aesthetically pleasing in an original document, a monochromatic reproduction of same may be difficult to read due to the resulting non-white background. Therefore, in this instance and many others, it has been deemed highly desirable to suppress the data contained in the background region of an original document for purposes of producing a reproduction of the original document with no background data or noise.

Digital image background suppression methods are widely known. An example of a suitable method is disclosed in U.S. Pat. No. 5,157,740 entitled "Method for Background Suppression in an Image Data Processing System" and assigned on its face to Unisys Corporation. Another example of a background suppression method and apparatus is found in U.S. Pat. No. 3,652,791 entitled "Circuitry for Distinguishing Between Background and Intelligence Areas on a Document" and assigned on its face to Xerox Corporation. The disclosures of U.S. Pat. Nos. 5,157,740 and 3,652,791 are expressly incorporated by reference herein. Digital image processing systems employing background suppression capabilities have not heretofore allowed a user to control the background data acquisition mode so that the user is able to select the appropriate background data acquisition mode depending upon the user's need for high-quality background suppression versus the user's need for high speed document reproduction. That is to say, prior systems allow a user to select only a single background suppression mode, and the single available background suppression mode selected may often be too time-consuming for the user's needs.

For example, prior systems including background suppression capabilities typically require that the entire document be "pre-scanned" for purposes of acquiring the background data from the document. This background data obtained during the "full pre-scan" is fed to a background suppression system which adjusts the document scanning parameters or settings. Then, the full document must be re-scanned with these background suppression settings in place. Obviously, while this full pre-scan approach to obtaining the background data results in a high-quality output image, this mode is very time consuming and often may not be usable due to its detrimental effect on performance, especially given consumer demand for high-speed document reproduction. Other system base the background suppression settings on a portion of the document scanned during the main scanning operation, but do not update the background suppression settings as the main document scanning operation proceeds.

Regardless of the particular background suppression data acquisition mode used by prior digital image processing apparatus/methods, prior systems have not allowed a user to select one of a plurality of different background data acquisition modes as required for a particular document reproduction operation so that the user may select higher quality background suppression or higher speed document reproduction as appropriate to a particular document reproduction job.

SUMMARY OF THE INVENTION

In accordance with the present invention, new and improved digital image processing methods and apparatus are provided including plural selectable background suppression data acquisition modes for user control of background suppression quality versus document reproduction speed.

In accordance with a first aspect of the present invention, a digital image processing apparatus includes a scanner for converting a printed document into a digital image in a main document scanning operation, an output device for printing the digital image, and an image processing unit operatively connected to the scanner and the output device and adapted to control same. The image processing unit includes at least two different means for selectively implementing a background suppression data acquisition operation selected from the following: (1) an on-the-fly background suppression data acquisition mode wherein the scanner periodically obtains background suppression data from said printed document during the main scanning operation; (2) a partial pre-scan background suppression data acquisition mode wherein the scanner pre-scans a portion of the printed document prior to performing the main scanning operation for purposes of obtaining background suppression data from the printed document for use in the main scanning operation; (3) a hybrid on-the-fly and partial pre-scan background suppression data acquisition mode wherein the scanner pre-scans a portion of the printed document prior to performing the main scanning operation for purposes of obtaining background suppression data from the printed document for use in the main scanning operation, and wherein the scanner obtains further background suppression data from the printed document periodically during the main scanning operation; and, (4) a full pre-scan background suppression data acquisition mode wherein the scanner pre-scans the entire printed document to obtain background suppression data for the entire printed document for use in a subsequent main document scanning operation.

In accordance with another aspect of the present invention, a digital image processing apparatus includes means for scanning a printed document, means for digital image processing connected to the scanning means to receive digital image data therefrom, and means for user selection of one of a plurality of different background suppression data acquisition modes for implementation by the scanning means and the digital image processing means. The plurality of different background suppression data acquisition modes selectable by the user selection means include: (1) an on-the-fly background suppression data acquisition mode wherein the scanning means obtains background suppression data from the printed document during a single-pass, main scanning operation; and, (2) a partial pre-scan background suppression data acquisition mode wherein the scanning means pre-scans a portion of the printed document prior to performing the main scanning operation for purposes of obtaining background suppression data from the printed document for use in the main scanning operation.

In accordance with still another aspect of the present invention, a method of reproducing a printed document comprises using an input device of an image processing unit to select a background suppression data acquisition mode from a plurality of background suppression data acquisition modes including: (1) an on-the-fly background suppression data acquisition mode including obtaining background suppression data from the printed document during a single-pass, main scanning operation of the entire printed document; (2) a partial pre-scan background suppression data acquisition mode including pre-scanning a portion of the printed document prior to performing the main scanning operation for purposes of obtaining background suppression data from the printed document for use in the main scanning operation of the entire printed document; (3) a hybrid on-the-fly and partial pre-scan background suppression data acquisition mode including pre-scanning a portion of the printed document prior to performing the main scanning operation of the entire printed document for purposes of obtaining background suppression data from the printed document for use in the main scanning operation of the entire printed document, and thereafter obtaining further background suppression data from the printed document during the main scanning operation; and, (4) a full pre-scan background suppression data acquisition mode including pre-scanning the entire printed document to obtain background suppression data for the entire printed document and thereafter performing a main document scanning operation of the entire printed document using the background suppression data obtained by said entire document pre-scanning operation. Each of the plurality of background suppression data acquisition modes is selectable by a user via the user input device. The printed document is then pre-scanned and/or scanned in accordance with the background suppression data acquisition mode selected with the user input device. A background-suppressed digital image representing the printed document is constructed based upon data obtained in the main scanning operation, and the background-suppressed digital image is printed.

One advantage of the present invention resides in the provision of new and improved digital image processing methods and apparatus including plural selectable background suppression data acquisition modes for user control of background suppression quality versus document reproduction speed.

Another advantage of the present invention is found in the provision of a digital image processing apparatus which provides a plurality of different background suppression data acquisition modes, wherein a user is able to select one of a plurality of different modes depending upon the quality of background suppression needed and depending upon the desired document reproduction performance.

A further advantage of the invention is that it provides for on-the-fly background suppression data acquisition which results in high-speed document reproduction using only a single scan (i.e., no pre-scan), and also results in good background data suppression based upon background data obtained at intervals during the single main scan of the document.

A still further advantage of the present invention resides in the provision of partial or "mini" pre-scan background suppression data acquisition which requires pre-scanning only an initial portion of the document to be reproduced, wherein the background suppression data obtained during the pre-scan is used to suppress background data for the entire document during a subsequent main scanning of the entire document.

Yet another advantage of the present invention is found in the provision of on-the-fly background suppression data acquisition combined with a partial pre-scan background suppression data acquisition, for purposes of suppressing the background data found at the initially scanned portion of the document and for purposes of providing initial background suppression data for use in determining starting background suppression settings.

A yet further advantage of the invention is that it provides for full pre-scan background suppression data as needed for highest quality background suppression where document reproduction speed is less critical.

Another advantage of the invention is the provision of an image processing apparatus wherein, when a user selects background suppression data acquisition together with another image processing operation requiring a full or partial document pre-scan, the apparatus automatically incorporates the otherwise required full or partial pre-scan into the background suppression data acquisition operation given that image processing speed will not be adversely affected.

Still other benefits and advantages of the present invention will become apparent to those of ordinary skill in the art to which the invention pertains upon reading and understanding the present specification together with the accompanying drawings.

BRIEF DESCRIPTION OF THE DRAWINGS

The invention may take form in various steps and arrangements of steps, and in various components and arrangements of components. The drawings are only for purposes of illustrating preferred embodiments of the invention, and they are not intended for use in limiting the invention in any way.

DETAILED DESCRIPTION OF PREFERRED EMBODIMENTS

Figure 1:
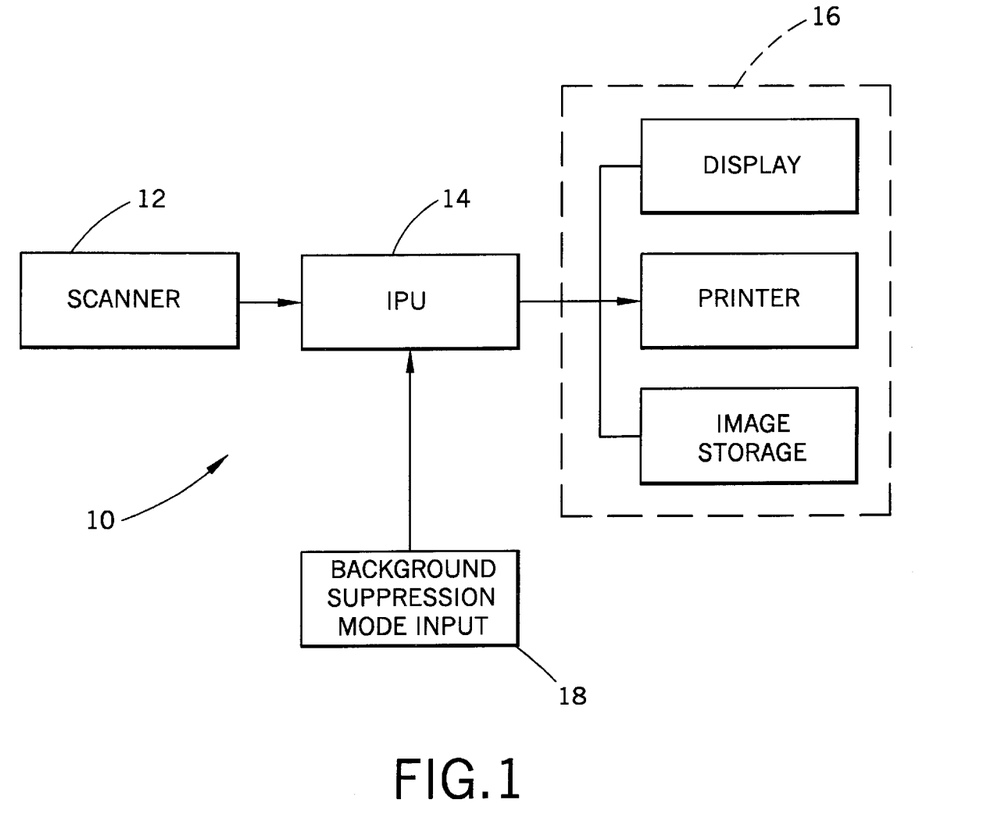
FIG. 1 is a simplified block diagram illustrating a digital image processing system in accordance with the present invention.

Referring now to the drawings where the showings are for purposes of describing preferred embodiments of the invention only and not for purposes of limiting same, a digital image processing system 10 in accordance with the present invention is shown in FIG. 1. An image input scanner 12 derives and delivers digital image data in the form of one or more monochromatic separations, wherein the picture elements or "pixels" of each separation are defined at a depth of "d" bits per pixel where "d" is an integer. Accordingly, each pixel of each separation is defined in terms of "d" bits per pixel (bit depth=d), and each pixel has some "gray" value between full "off" and full "on." When the digital image data is provided in terms of a single monochromatic separation, the image is monochromatic, for example, so called "black-and-white" image data. On the other hand, when the digital image data is provided in terms of two or more monochromatic separations, a color image results when the data from the separations is combined, for example, red-green-blue (RGB) separations or cyan-magenta-yellow (CMY) separations.

The image signals are input from the scanner 12 to an image processing unit 14 wherein digital image processing, such as background data suppression, is performed. The image processing unit 14 may be provided by any suitable electronic computing apparatus such as an electronic computer, a dedicated electronic circuit, or any other suitable electronic circuit means. The image processing unit 14 outputs data in a suitable format to an image output terminal 16 such as a digital printer and/or visual display. Suitable apparatus for digital image input and/or output include the XEROX Document Center 265DC digital imaging system, Pixelcraft 7650 Pro Imager Scanner, XEROX DocuTech Production Printing System scanners, the XEROX 5775 digital color copier, the XEROX 5760 and 5765 Majestik digital color copiers, or any other suitable digital scanner and/or copier. Regardless of the depth d at which each pixel is defined, the location of each pixel in each separation bitmap is also defined, typically in terms of a row n and a column m.

The digital image processing system 10 includes a background suppression data acquisition mode input switch 18, which may be provided by one or more suitable input devices such as a push-button switch, a keyboard/keypad, a touch screen, and/or any other suitable input device, for user selection of one of a plurality of different background suppression data acquisition modes to be carried out by the image processing unit 14. It should be noted that the present invention relates to an image processing system including a plurality of different user-selected background suppression data acquisition modes used to acquire background data from a printed document for use in the image processing unit 14 by any suitable background suppression method or means—i.e., the present invention does not relate to a particular background suppression method or apparatus, but rather to image processing methods/apparatus wherein different modes are provided for acquiring the background suppression data from the original document for use by any suitable background suppression method/apparatus.

Figure 2:
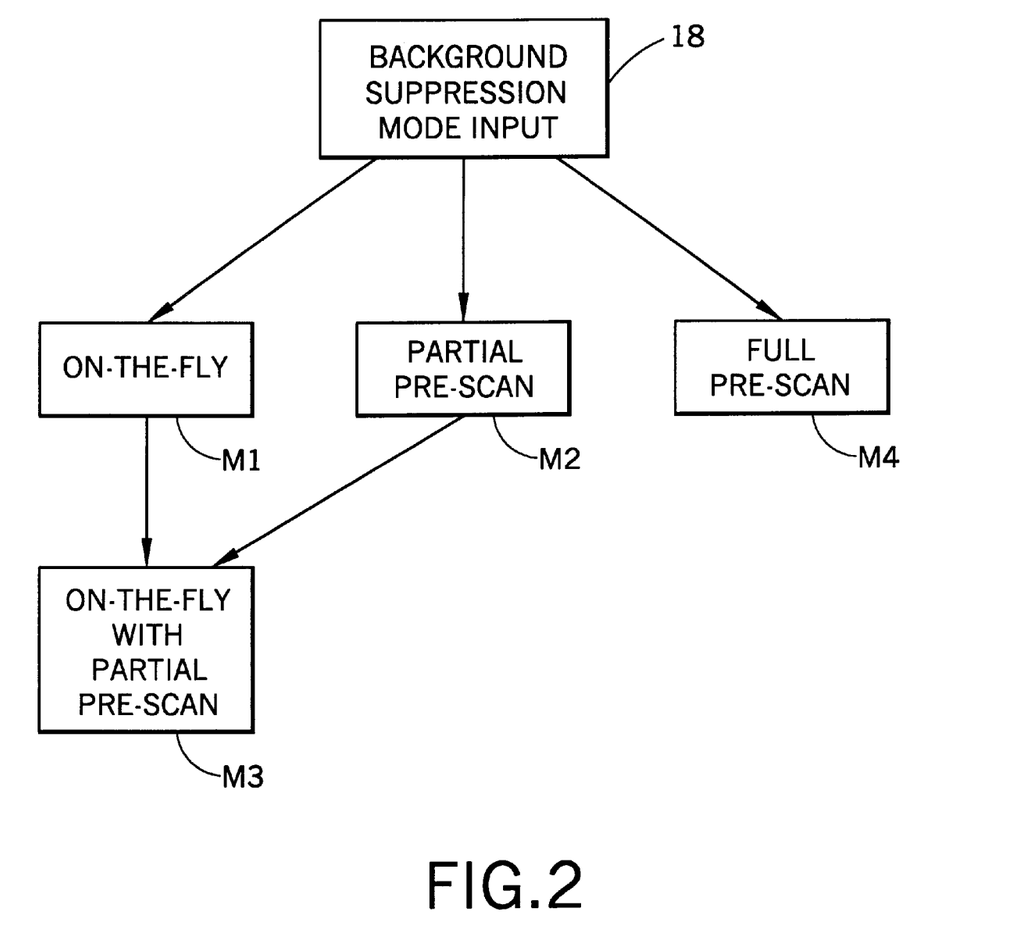
FIG. 2 is a diagram illustrating a plurality of different background suppression data acquisition modes in accordance with the methods and apparatus of the present invention.

FIG. 2 diagrammatically illustrates the various background suppression data acquisition modes available to a user of the digital image processing apparatus 10 through manipulation of the switch 18 or other mode selector means. More particularly, a user is able to select an on-the-fly background suppression data acquisition mode M1, a partial or "mini" pre-scan background suppression data acquisition mode M2, a "hybrid" or combined on-the-fly and partial pre-scan background suppression data acquisition mode M3 which comprises a combination of the on-the-fly and partial pre-scan modes M1,M2, and a full pre-scan background suppression data acquisition mode M4. With each of the modes M1–M4, the image processing unit 14 is programmed to control the image input scanner 12 in a particular manner so that background suppression data is acquired in a selected manner from the document being scanned for reproduction.

Figure 3:
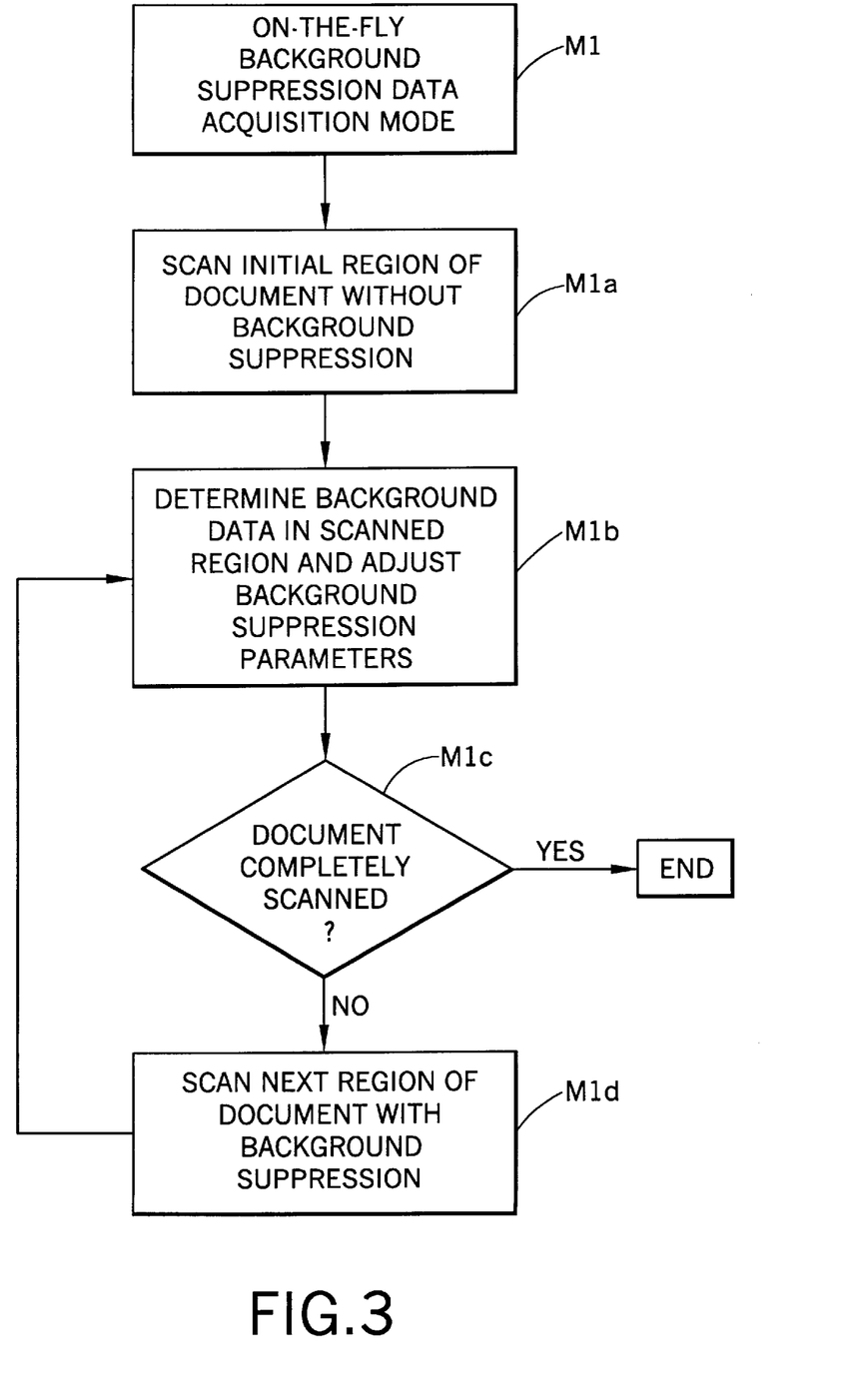
FIG. 3 is a flow chart illustrating an on-the-fly background suppression data acquisition mode in accordance with the present invention.

With reference now to FIG. 3, the on-the-fly background suppression data acquisition mode M1 in accordance with the present invention is illustrated. Document reproduction using the on-the-fly background suppression data acquisition mode M1 in aaccordance with the present invention does not require that the document being reproduced be pre-scanned to acquire background suppression data therefrom. Instead, the background suppression data is acquired by the image input scanner 12 during the main document scan used for reproducing the document. More particularly, a step or means M1a operates the input scanner 12 to scan an initial region (e.g., 10–30 scanlines, 1–3 centimeters, or some other initial region) of the document without any background suppression. A step or means M1b determines the background suppression data in the scanned initial region and adjusts the background suppression parameters in the image processing unit 14.

A step or means M1c determines if the document as been completely scanned. If the document has been completely scanned, the on-the-fly background suppression data acquisition mode M1 in accordance with the present invention is ended. On the other hand, if the document has not yet been completely scanned, a step or means M1d scans the next region of the document (the region scanned by the step or means M1d preferably being the same size as the initial region scanned by the step or means M1a) using background suppression based upon the background suppression parameters determined by the step or means M1b. Steps M1b–M1d are repeated, with the step or means M1b continually updating the background suppression parameters in the image processing unit 14 based upon the background suppression data acquired by the step or means M1d, until the step or means M1c determines the document has been completely scanned.

Those skilled in the art will recognize that, because the on-the-fly background suppression data acquisition mode M1 in accordance with the present invention does not require any pre-scan, reproduction of the subject document is very fast. On the other hand, it will also be recognized that the initial region of the document scanned by the step or means M1a must be scanned without any background suppression. Furthermore, when using the on-the-fly background suppression data acquisition mode in accordance with the present invention, the quality of background suppression performed in the image processing unit 14 will generally improve as the steps M1b–M1d are repeated so that sufficient background suppression data is obtained from the document being reproduced.

Figure 4:
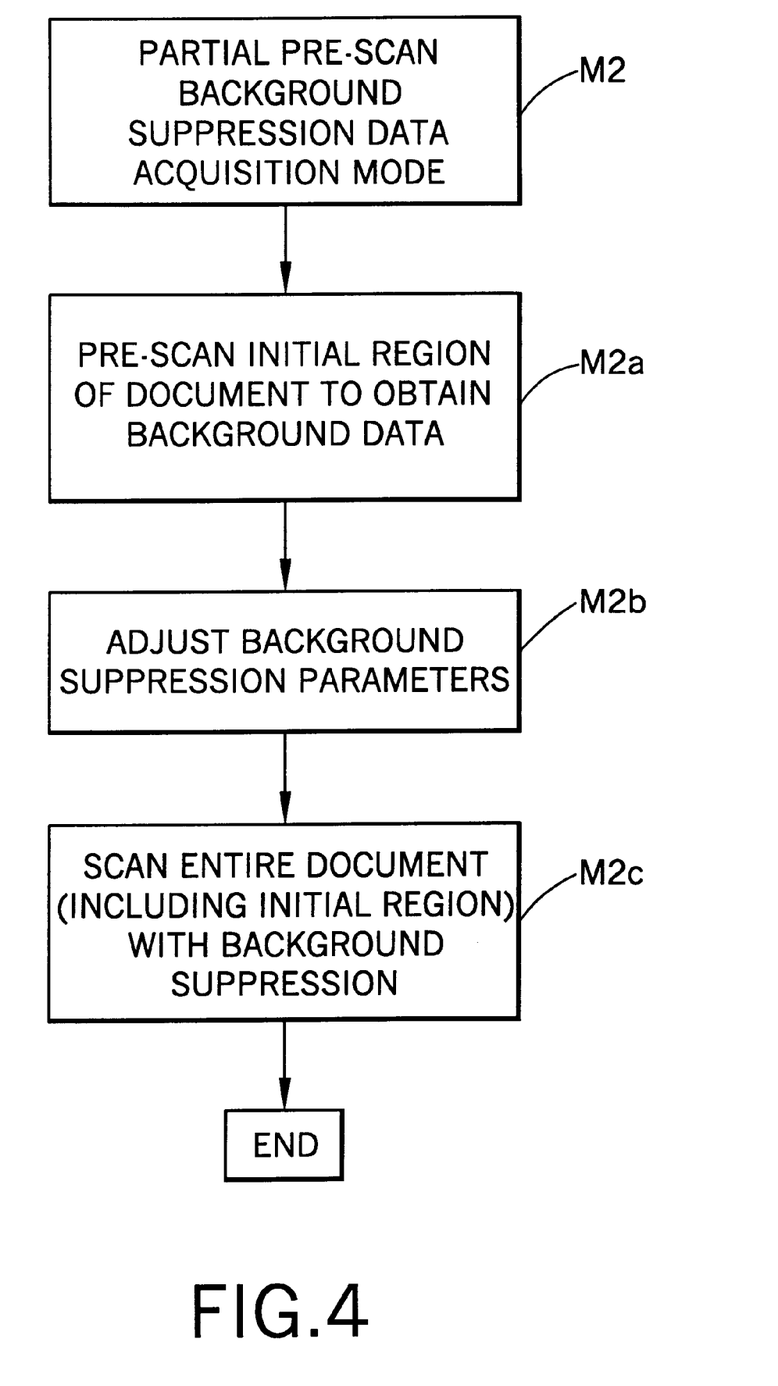
FIG. 4 is a flow chart illustrating a partial or "mini" pre-scan background suppression data acquisition mode in accordance with the present invention.

FIG. 4 illustrates the partial or "mini" pre-scan background suppression data acquisition mode M2 in accordance with the present invention. A step or means M2a operates the input scanner 12 to pre-scan an initial region (e.g., 10–30 scanlines, 1–3 centimeters, or some other initial region) of the document for purposes of obtaining background suppression data from the initial region of the document. Generally, unless this initial region is full black (or other color) or full white, the background data obtained therefrom will be representative of the background suppression data for the remainder of the document. Thereafter, a step or means M2b adjusts the background suppression settings or parameters in the image processing unit 14 and a step or means M2c operates the image input scanner 12 to perform a main scan on the entire document with background suppression enabled and set according to the parameters determined from the background suppression data obtained by the step or means M2a in the partial pre-scan operation.

Those of ordinary skill in the art will recognize that, using the partial pre-scan background suppression data acquisition mode M2 as set forth in FIG. 4, the initial region of the document being reproduced is also re-scanned during the subsequent main scan with background suppression enabled. This, then, produces a higher-quality reproduction wherein the initially pre-scanned region is also reproduced with the background data suppressed. The partial pre-scan performed by the step or means M2a is not overly detrimental to the speed at which a document is reproduced using the image processing apparatus 10 given that only a small, initial region of the document is pre-scanned. The size of the initial region pre-scanned by the step or means M2a may be varied without departing from the overall scope and intent of the present invention.

While the partial pre-scan background suppression data acquisition mode M2 generally provides sufficient and representative background suppression data from the document being reproduced so that a high-quality background-suppressed reproduction results, background suppression based upon this partial pre-scan mode M2 is sub-optimal in terms of background suppression quality given that the entire document being reproduced is not pre-scanned. If the background of the document varies significantly, the background suppression operation based upon the background suppression data obtained in the partial pre-scan operation will not be effective for all regions of the document.

Figure 5:
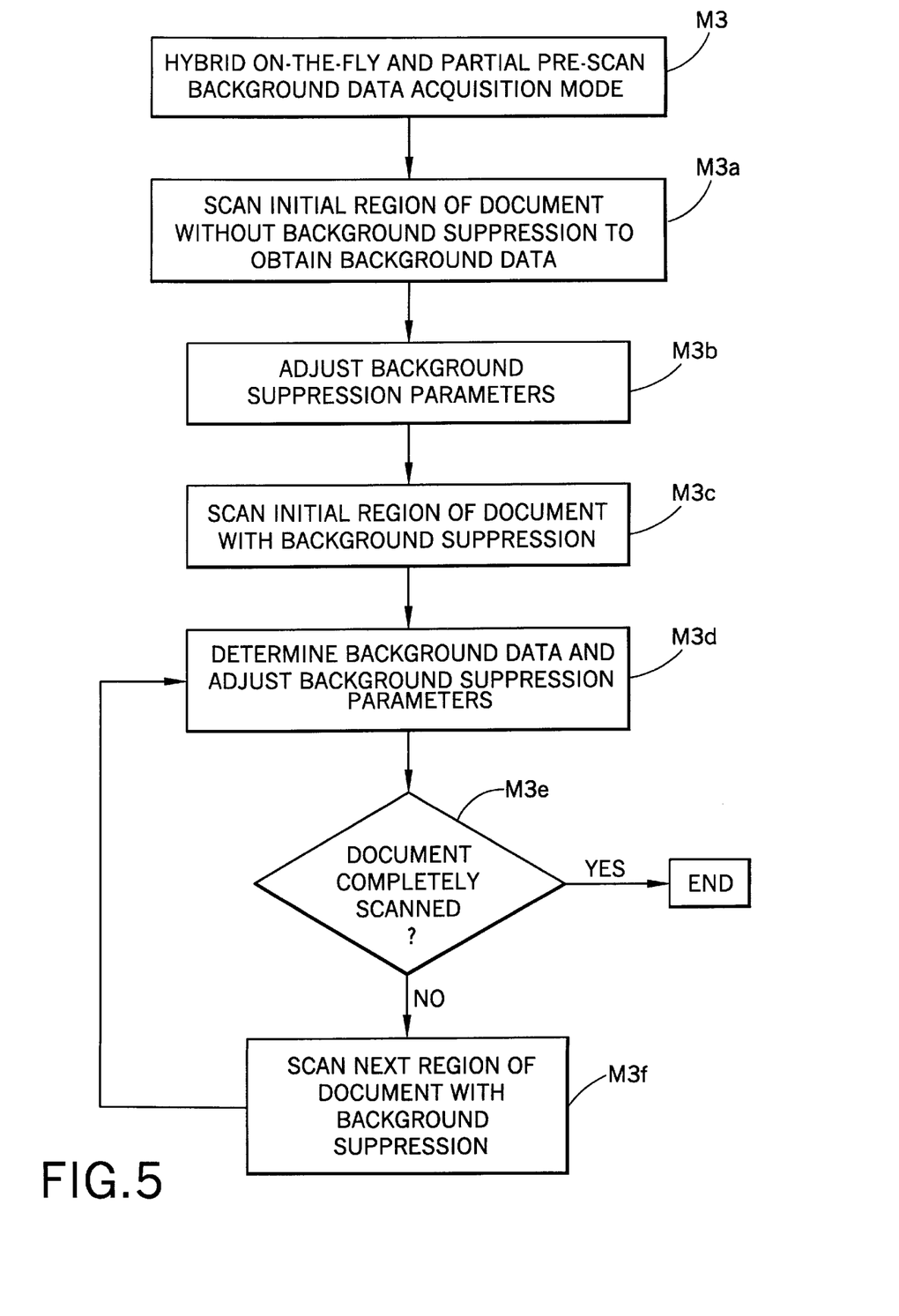
FIG. 5 is a flow chart illustrating a hybrid on-the-fly background suppression data acquisition mode with partial or "mini" pre-scan in accordance with the present invention; and, FIG. 6 is a flow chart illustrating a full pre-scan background suppression data acquisition mode in accordance with the present invention.

In order to overcome these deficiencies and others associated with the on-the-fly background suppression data acquisition mode M1 and the partial pre-scan background suppression data acquisition mode M2, as needed, the present invention provides a hybrid on-the-fly and partial pre-scan background suppression data acquisition mode M3 selectable by a user of the apparatus 10 via the background suppression data acquisition mode selector switch 18.

The on-the-fly with partial pre-scan background suppression data acquisition mode M3 is a combination of the above-described on-the-fly and partial pre-scan modes M1,M2. With reference to FIG. 5, the on-the-fly with partial pre-scan mode M3 is illustrated. A step or means M3a operates image input scanner 12 to pre-scan an initial region of the document being reproduced without any background suppression enabled for purposes of obtaining background suppression data from the document. Again, the size of the initial region scanned may be varied as described above. For example, an initial region of approximately 10–30 scanlines or 1–3 cm of the document has been found to be effective.

Thereafter, a step or means M3b adjusts the background suppression parameters in the image processing unit 14 based upon the background suppression data acquired by the step or means M3a. A step or means M3c then re-scans the initial region of the document with background suppression set according to the parameters specified in the image processing unit 14 by the step or means M3b. A step or means M3d determines the background suppression data from the region scanned by the step or means M3c and further adjusts the background suppression parameters in the image processing unit 14.

A step or means M3e determines if the document has been completely scanned, and if it has, the scanning process ends. Otherwise, a step or means M3f scans the next region (preferably equal in size to the initial region) of the document using background suppression set with the parameters as adjusted by the step or means M3d. Steps M3d–M3f are repeated until the step or means M3e determines that the document has been completely scanned.

Those skilled in the art will recognize that the hybrid on-the-fly/partial pre-scan background suppression data acquisition mode M3 in accordance with the present invention allows for superior background suppression relative to either the on-the-fly data acquisition mode M1 or the partial pre-scan data acquisition mode M3 due to the fact that the pre-scanning operation acquires background suppression data for use in suppressing background data during the subsequent on-the-fly scanning of the initially pre-scanned region. Furthermore, the overall amount of background suppression data acquired is greater than either the on-the-fly or partial pre-scan modes M1,M2, thus resulting in more background suppression data for input to the background suppression algorithm being implemented in the image processing unit 14. This, then, results in superior background suppression quality. Also, the speed of document reproduction is not unduly reduced given that only an initial region of the document being reproduced is pre-scanned.

Figure 6:
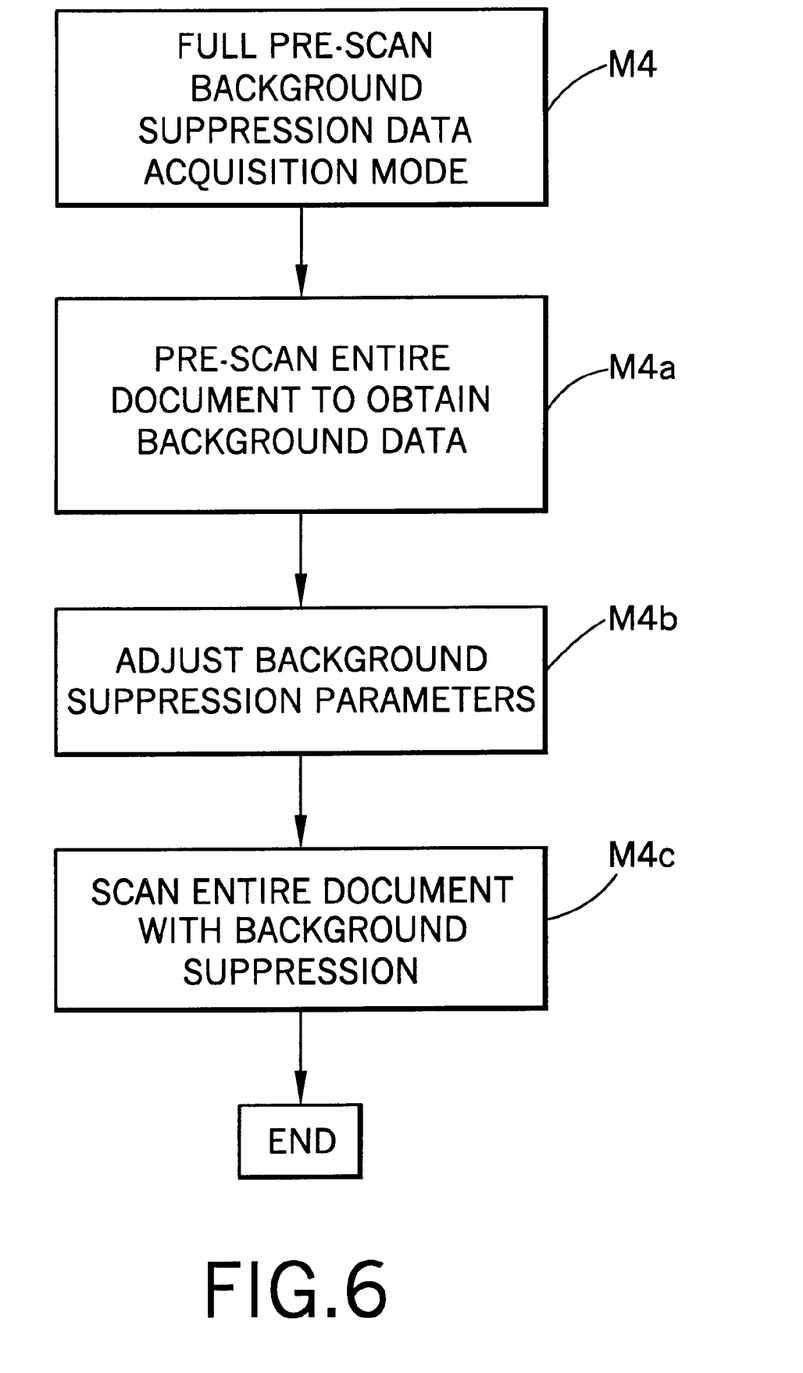

FIG. 6 illustrates a full document pre-scan background suppression data acquisition mode M4 in accordance with the present invention. A step or means M4a operates the image input scanner 12 to pre-scan the entire document being reproduced for purposes of obtaining background suppression data from the entire document. A step or means M4b uses the background suppression data obtained from the entire document during the full pre-scan to adjust the background suppression parameters in the image processing unit 14. Thereafter, a step or means M4c re-scans the entire document again with the background suppression enabled and set according to the parameters specified by the step or means M4b. While the full pre-scan background suppression data acquisition mode M4 is performance intensive, it does result in the acquisition of large amounts of background suppression data and, thus, results in a very high-quality background-suppressed reproduction of the subject document.

It will be recognized that a digital image processing system 10 in accordance with the present invention allows a user to select a particular background suppression data acquisition mode—on-the-fly M1, partial pre-scan M2, on-the-fly/partial pre-scan M3, full pre-scan M4—as required for a particular document reproduction operation, taking into consideration the necessary document reproduction speed and reproduction quality. Furthermore, the image processing unit 14 in accordance with the present invention is programmed to override a user-selected background suppression data acquisition mode M1–M3, other than the full pre-scan mode M4, in the event the image processing unit 14 determines that a more effective background suppression data acquisition mode may be enabled without any associated decrease in document reproduction speed. For example, if a user has selected the on-the-fly background suppression data acquisition mode M1, but has also selected another image processing operation to be performed by the image processing unit 14 which requires a full or partial document pre-scan (e.g., automatic document reduction/enlargement), the image processing unit 14 will use the otherwise required full or partial document pre-scan to obtain background suppression data from the document. Likewise, if the user has selected a background suppression data acquisition mode M2,M3 requiring a partial pre-scan, but the image processing unit 14 is also to perform another operation requiring a full document pre-scan, the otherwise required full document pre-scan will also be used to obtain background suppression data from the document.

The invention has been described with reference to preferred embodiments. Modifications and alterations will occur to others upon reading and understanding the preceding specification. It is intended that the invention be construed as including all such modifications and alterations insofar as they fall within the scope of the appended claims or equivalents thereof.

Having thus described the preferred embodiments of the invention, the invention is claimed to be:

1. A digital image processing apparatus comprising:
   a scanner for converting a printed document into a digital image in a main document scanning operation;
   an output device for printing said digital image; and,
   an image processing unit operatively connected to and adapted to control said scanner and said output device, said image processing unit including at least three of:
   means for selectively implementing an on-the-fly background suppression data acquisition mode wherein said scanner obtains background suppression data from said printed document during said main scanning operation;
   means for selectively implementing a partial pre-scan background suppression data acquisition mode wherein said scanner pre-scans a portion of the printed document prior to performing said main scanning operation for purposes of obtaining background suppression data from said printed document for use in said main scanning operation;
   means for selectively implementing a hybrid on-the-fly and partial pre-scan background suppression data acquisition mode wherein said scanner pre-scans a portion of the printed document prior to performing said main scanning operation for purposes of obtaining background suppression data from said printed document for use in said main scanning operation, and wherein said scanner obtains further background suppression data from said printed document during said main scanning operation; and,
   means for selectively implementing a full pre-scan background suppression data acquisition mode wherein said scanner pre-scans the entire printed document to obtain background suppression data for said entire printed document for use in a subsequent main document scanning operation.

2. The digital image processing system as set forth in claim 1, wherein said image processing unit includes each of said means for selectively implementing an on-the-fly background suppression data acquisition mode, said means for selectively implementing a partial pre-scan background suppression data acquisition mode, said means for selectively implementing a hybrid on-the-fly and partial pre-scan background suppression data acquisition mode, and said means for selectively implementing a full pre-scan background suppression data acquisition mode.

3. The digital image processing apparatus as set forth in claim 1, further comprising:
   a user input device to said image processing unit for selecting one of said at least two different background suppression data acquisition modes.

4. The digital image processing apparatus as set forth in claim 1 wherein said means for selectively implementing the on-the-fly background suppression data acquisition mode comprises:
   means for determining background suppression data for each of a plurality of successive regions of said printed document during said main scanning operation; and,
   means for altering background suppression parameters in said image processing unit during said main scanning operation based upon the background suppression data determined for each of said plurality of successive regions of said printed document.

5. The digital image processing system as set forth in claim 1 wherein said means for selectively implementing the partial pre-scan background suppression data acquisition mode comprises:
   means for determining background suppression data for said printed document based upon said portion of said printed document scanned in said pre-scan operation; and,
   means for setting background suppression parameters in said image processing unit based upon the determined background suppression data for said portion of said document scanned in said pre-scan operation.

6. The digital image processing apparatus as set forth in claim 1 wherein said means for selectively implementing the hybrid on-the-fly and partial pre-scan background suppression data acquisition mode comprises:
   means for determining background suppression data for said printed document from said portion of said printed document scanned in said pre-scan operation;
   means for setting background suppression parameters in said image processing unit based upon the determined background suppression data for said portion of said document scanned in said pre-scan operation;
   means for determining background suppression data for each of a plurality of successive regions of said printed document during said main scanning operation; and,
   means for altering background suppression parameters in said image processing unit during said main scanning operation based upon the background suppression data determined for each of said plurality of successive regions of said printed document.

7. The digital image processing apparatus as set forth in claim 1 wherein said means for selectively implementing the full pre-scan background suppression data acquisition operation comprises:
   means for determining background suppression data for said entire printed document based upon data obtained in said full document pre-scan operation;
   means for setting background suppression parameters in said image processing unit based upon the determined background suppression data for the entire printed document.

8. A digital image processing apparatus comprising:
   means for scanning a printed document;
   means for digital image processing connected to said scanning means to receive digital image data therefrom; and,
   means for user selection of one of a plurality of different background suppression data acquisition modes for implementation by said scanning means and said digital image processing means, said plurality of different background suppression data acquisition modes selectable by said user selection means including at least three of:

an on-the-fly background suppression data acquisition mode wherein said scanning means continuously obtains background suppression data from said printed document during a single-pass, main scanning operation;

a partial pre-scan background suppression data acquisition mode wherein said scanning means pre-scans a portion of the printed document prior to performing the main scanning operation for purposes of obtaining background suppression data from said printed document for use in said main scanning operation;

a hybrid on-the-fly and partial pre-scan background suppression data acquisition mode wherein said scanning means pre-scans a portion of the printed document prior to performing the main scanning operation for purposes of obtaining background suppression data from said printed document for use in said main scanning operation, and wherein said scanning means continuously obtains further background suppression data from said printed document during said main scanning operation; and, a full pre-scan background suppression data acquisition mode wherein said scanning means pre-scans the entire printed document to obtain background suppression data for said entire printed document for use in said main document scanning operation.

9. The digital image processing system as set forth in claim 8, further comprising:

means for overriding said selection means and selecting the hybrid background suppression data acquisition mode when a user uses said selection means to select the on-the-fly a background suppression data acquisition mode from said plurality of different background suppression data acquisition modes and when said digital image processing means is set to perform another image processing operation requiring a partial pre-scanning operation of said printed document.

10. The digital image processing system as set forth in claim 9, further comprising:

means for overriding said selection means and selecting the full pre-scan background suppression data acquisition mode when a user uses said selection means to select one of the on-the-fly, partial pre-scan, and hybrid background suppression data acquisition modes and when said digital image processing means is set to perform another image processing operation requiring a full pre-scan of said printed document.

11. A method of reproducing a printed document comprising:

using a user input device to an image processing unit to select a background suppression data acquisition mode from a plurality of background suppression data acquisition modes including:

an on-the-fly background suppression data acquisition mode including periodically obtaining background suppression data from said printed document during a single-pass, main scanning operation of the entire printed document, a partial pre-scan background suppression data acquisition mode including pre-scanning a portion of the printed document prior to performing the main scanning operation for purposes of obtaining background suppression data from said printed document for use in said main scanning operation of the entire printed document, a hybrid on-the-fly and partial pre-scan background suppression data acquisition mode including pre-scanning a portion of the printed document prior to performing the main scanning operation of the entire printed document for purposes of obtaining background suppression data from said printed document for use in said main scanning operation of the entire printed document, and thereafter periodically obtaining further background suppression data from said printed document during said main scanning operation, and, a full pre-scan background suppression data acquisition mode including pre-scanning the entire printed document to obtain background suppression data for said entire printed document and thereafter performing a main document scanning operation of said entire printed document using said background suppression data obtained by said entire document pre-scanning operation, wherein each of said plurality of background suppression data acquisition modes is selectable by a user using said user input device;

scanning said printed document in accordance with the background suppression data acquisition mode selected with said user input device;

constructing a background-suppressed digital image representing said printed document based upon data obtained in said main scanning operation; and, printing said background-suppressed digital image.

* * * * *